United States Patent
Coleman et al.

(10) Patent No.: US 6,704,611 B2
(45) Date of Patent: Mar. 9, 2004

(54) SYSTEM AND METHOD FOR ROUGH MILLING

(75) Inventors: Glenn I. Coleman, Cave Creek, AZ (US); Kenneth D. Merritt, Prescott, AZ (US)

(73) Assignee: Surfware, Inc., Westlake Village, CA (US)

( * ) Notice: Subject to any disclaimer, the term of this patent is extended or adjusted under 35 U.S.C. 154(b) by 16 days.

(21) Appl. No.: 10/212,987

(22) Filed: Aug. 5, 2002

(65) Prior Publication Data

US 2003/0040834 A1 Feb. 27, 2003

Related U.S. Application Data

(60) Provisional application No. 60/314,010, filed on Aug. 21, 2001.

(51) Int. Cl.[7] ............................................... G06F 19/00
(52) U.S. Cl. ........................ 700/186; 700/95; 700/117; 700/182; 703/103 R; 29/592
(58) Field of Search ............................ 700/56, 95, 114, 700/117, 159, 182, 186, 193; 703/100, 103 R; 29/592

(56) References Cited

U.S. PATENT DOCUMENTS

| | | | | |
|---|---|---|---|---|
| 4,961,041 A | * | 10/1990 | Seki et al. | .................. 318/578 |
| 5,184,306 A | | 2/1993 | Erdman et al. | |
| 5,329,457 A | * | 7/1994 | Hemmerle et al. | ......... 700/193 |
| 5,432,704 A | | 7/1995 | Vouzeland et al. | |

* cited by examiner

*Primary Examiner*—Jayprakash N. Gandhi
(74) *Attorney, Agent, or Firm*—Akin Gump Strauss Hauer & Feld, L.L.P.

(57) ABSTRACT

An automated computer-implemented method for generating commands for controlling a computer numerical control machine to fabricate an object from a workpiece. The method includes the steps of: (1) determining a first set of Z coordinates for machining a first set of Z level planar slices with a first tool; and (2) determining a second set of Z coordinates for machining a second set of Z level planar slices with the first tool. The second set of Z coordinates is partitioned into one or more subsets. Each subset corresponds to a pair of adjacent Z coordinates belonging to the first set of Z coordinates. A distance between the Z coordinates of each subset is a unit fraction of a distance between the Z coordinates of the pair of adjacent Z coordinates which corresponds to each subset.

51 Claims, 12 Drawing Sheets

US 6,704,611 B2

SYSTEM AND METHOD FOR ROUGH MILLING

CROSS-REFERENCE TO RELATED APPPLICATIONS

This application claims the benefit of U.S. Provisional Application No. 60/314,010 filed Aug. 21, 2001 entitled "System and method for Step Reduction Milling".

BACKGROUND OF THE INVENTION

The present invention relates to computer numerical control (CNC) machines and more particularly, to a method and apparatus for generating commands for controlling a CNC machine.

Computer numerical control (CNC) machines are utilized to automatically fabricate machined parts and molds. Based on computer generated commands, CNC machines move one or more cutting tools in three-dimensional space to mill, cut, bore and otherwise shape a work piece into a desired form. Shaping the work piece into the desired form is typically a process in which each tool is moved in a series of paths to gradually cut away material of a workpiece until the work piece takes on the desired form with the desired finish.

Computer Aided Manufacturing (CAM) software provides for substantially automating the process of creating the computer commands used for moving the cutting tools of a CNC machine. Generally, CAM software, accepts two-dimensional and three-dimensional design information which defines the dimensions of the workpiece from which the part is to be machined and also defines the dimensions of the finished part. The design information may be manually input by a user and also input from data files produced by computer-aided design (CAD) software. Based on the design information, CAM software generates a series of tool paths for each tool of a set of cutting tools selected by the user to produce the machined part in the desired form. CAM software also typically suggests to the user, cutting parameters such as tool feed rates and spindle speeds, in addition to computing the tool paths, although it is common to provide for user overrides of the suggested feed rate settings and spindle speeds.

Of great importance to CNC machining is: (1) the speed in which the computer commands can be created from the design information and (2) the speed at which a given part may be machined. Known CAM software includes numerous features designed to improve the speed of the CNC machine cutting process. However, the features for improving the speed of machining generally come at the expense of increased time to create the computer commands. Such features include gouge avoidance, edge protection, scallop-height control, gouge checking, isolation of steep and shallow machining, integrated tool path verification and remaining stock machining, all of which features are well-known in the field.

Known CAM software used for generating the tool paths for complex milling such as that required for machining molds, generally generates CNC commands that result in three phases of machining to form the complex machined part, i.e.: (1) rough milling, (2) intermediate milling, and (3) finish milling.

The rough milling process frequently consists of milling away parallel, planar slices of the work piece at a succession of constant Z levels. The process is known generally as "Z level roughing" or "constant Z milling". The Z level roughing process typically uses a relatively large (roughing) tool or tools to remove a large amount of material relatively quickly, but it also leaves a series of "steps," or "terraces," on any surfaces that are non-vertical or non-horizontal. The height of the steps formed by a single tool in the Z level roughing process is typically a constant value, the height of the steps being a function of a predetermined parameter which determines a depth of cut of the roughing tool. The larger is the depth of cut of the roughing tool, the higher are the resulting steps.

In contrast to the height of each step being held constant, the "width" of each step varies as a function of the diameter of the tool, the topology of the tool, the depth of the cut, and the topology of the surface being machined. Accordingly, the width of a step can vary greatly over a curved surface. As the surface approaches vertical, the width of the steps gets narrower. As the surface approaches horizontal, the steps get wider.

The relatively large size of the roughing tool generally precludes the CNC machine from cutting a smooth curved surface into the material of the workpiece. It is also extremely common that, in all but the simplest cases, the roughing tool is not able to mill detailed portions of a given planar slice. However, finish milling requires that the load on the finish tool be kept within an acceptable range in order to produce the required finish, necessitating a generally uniform workpiece surface be left by the roughing process. Consequently, before finish milling can begin: (1) the height and the width of the steps produced in rough milling must be reduced to acceptably small dimensions, and (2) the detailed areas in each slice, where the large tool is unable to cut due to its relatively large diameter, must be machined out. Accordingly, an intermediate milling process is generally performed by CNC machines between the rough milling and the finish milling phases of machining the workpiece.

Known techniques for preparing the workpiece for finish milling, i.e. intermediate milling, typically employ a process referred to as remaining stock (REST) milling. REST milling is a process for identifying the remaining material left over after a previously made rough milling cut, and removing the remaining stock using a tool or tools which are generally smaller than the rough cutting tool. REST milling generally comprises the following steps: (1) the difference between the final work piece shape and the shape of the cut made by the existing tool is computed; (2) a new smaller tool is generally chosen by the user; (3) a tool path is computed for the new tool in order to cut the remaining material in an efficient manner; (4) the remaining material is cut with the new tool; and (5) the process is repeated with successively smaller and smaller tools until the desired surface uniformity is achieved.

Known REST milling methods suffer from certain drawbacks and inefficiencies. In particular, typical REST milling requires the computation of the three dimensional volume of material that remains after each tool is finished milling the workpiece. The volume computation is required in order to program the motion of the next tool to avoid either "cutting air" or overloading the tool with too heavy a cut. The computation of the three dimensional volume results in a substantial computational load, significantly increasing the time required to generate the CAM software program output. Further, for complex design shapes, the shape of the initial tool path for the larger rough cutting tool frequently leaves significant uncut portions of material. Using a substantially smaller tool for each successive REST milling step results in slower material removal rates, due to the reduced depth of cut and step over for the smaller tool. Alternatively, if the same size tool is used for successive REST milling steps, significantly greater programming time is required. Choosing an intermediate size REST tool to maximize the tool removal rate often results in the need to perform additional iterations with a still smaller tool.

There is a need for a CAM software program which produces a series of tool paths which result in a machined surface which is ready for finish milling, and which: (1) reduces the amount of human-interaction time required for programming the CAM software program, (2) is faster to create the tool paths than existing CAM software programs and (3) creates tool paths which result in faster machining of a complex machined part than existing CAM software programs.

BRIEF SUMMARY OF THE INVENTION

The present invention comprises an automated computer-implemented method, apparatus and article of manufacture for generating commands for controlling a computer numerical control machine to fabricate an object from a workpiece. The method includes the steps of: (1) determining a first set of Z coordinates for machining a first set of Z level planar slices with a first tool; and (2) determining a second set of Z coordinates for machining a second set of Z level planar slices with the first tool. The second set of Z coordinates is partitioned into one or more subsets. Each subset corresponds to a pair of adjacent Z coordinates belonging to the first set of Z coordinates. A distance between the Z coordinates of each subset is a unit fraction of a distance between the Z coordinates of the pair of adjacent Z coordinates which corresponds to each subset.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings.

DETAILED DESCRIPTION OF THE INVENTION

Figure 1:
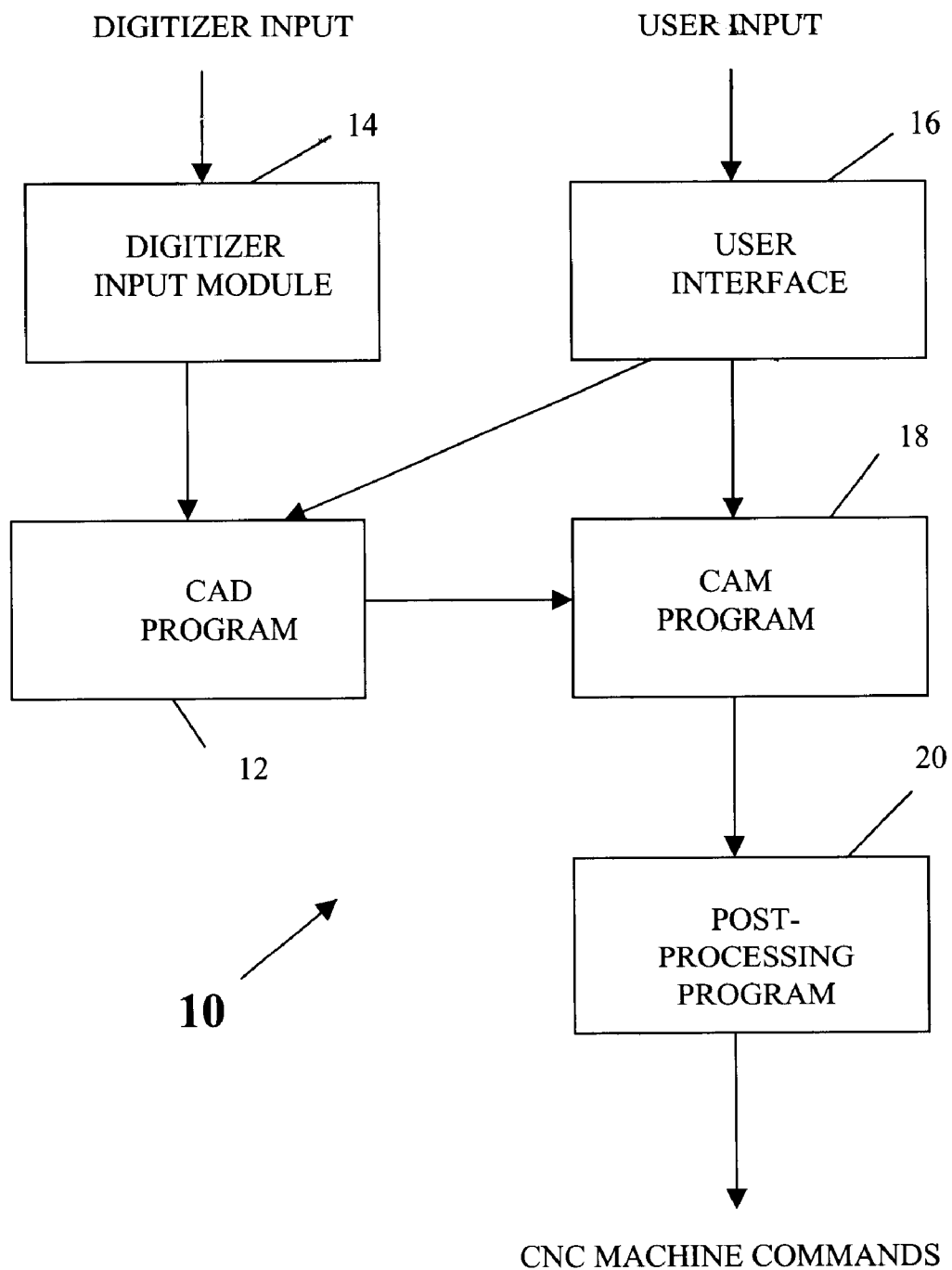
FIG. 1 a functional block diagram of a computer numerical control (CNC) computer program according to a preferred embodiment.

Referring to the drawings, wherein like numerals are used to indicate like elements throughout the several figures and the use of the indefinite article "a" may indicate a quantity of one, or more than one of an element, there is shown in FIG. 1, a functional block diagram of a preferred embodiment of a computer numerical control (CNC) computer program 10 for creating CNC commands and for providing the CNC commands to a CNC machine to produce a physical object having a surface finish which is ready for finish milling.

In the present invention, as described hereafter, rough milling of a workpiece is accomplished by removing material from work piece by moving a cutting tool in a succession of parallel, constant Z level paths or slices. Accordingly, the present invention first computes sets of Z coordinates for machining sets of Z level cuts with one or more tools. The present invention then creates tool paths for each tool at each Z level. Finally, the present invention generates a series of commands that choose each tool in order and moves each tool along the tools paths associated with each tool.

Preferably, the CNC computer program 10 includes a computer aided design (CAD) computer subprogram 12 which accepts dimensional information about an object to be formed and a workpiece from which the object is to be formed, and translates the dimensional information into models defining the object and the workpiece. Preferably, the dimensional data is received from 3D digitizers through the digitizer input module 14. Such CAD subprograms and 3D digitizers are well known to those in the art. Alternatively dimensional data may be entered by other known means, such as 2D tablets and by manual key entry through the user interface 16. Further, as would be clear to those skilled in the art, the CAD computer subprogram 12 could be separate from the CNC computer program 10.

The CNC computer program 10 also includes a computer aided manufacturing (CAM) computer subprogram 18. Preferably, the CAM computer subprogram 18 accepts the model output of the CAD computer subprogram 12. The CAM computer subprogram 18 also accepts user provided information about the desired finish characteristics of the object, and information about tools selected for machining the object from the workpiece. Preferably, the information is entered by the user from a keyboard or by a mouse utilizing on-screen dialog boxes displayed on a video display. The output of the CAM computer subprogram 18 is a series of instructions which provide for the automatic selection of the tools, positioning of the workpiece, tool paths, feed rates etc. by the CNC machine, as further described below. Preferably, the instructions generated by the CAM computer subprogram 18 are converted to a command set by a post processing computer subprogram 20 which converts the instructions generated by the CAM computer subprogram 18 to the command set of the specific CNC machine being controlled. The preferred embodiment of the post processing subprogram 20 includes a database which provides for converting the CAM program instructions to a variety of known, commercially available CNC machines.

The CNC computer program 10 for practicing the present invention can be written in any suitable programming language, including (but not limited to) C, C++ and Java. and can be developed using standard programming practices to carry out the steps and techniques described herein.

Preferably, the CNC computer program 10 executes on a standalone programmable computer platform having an open type of architecture of a kind commonly called a personal computer, which interfaces to a CNC machine controller using one of any well known interface standards. Preferably, the personal computer employs a Pentium III™ microprocessor chip manufactured by Intel Corporation. Preferably, the personal computer and also includes, a random access memory, a non-volatile memory such as a hard disk, a mouse and a video display. Preferably, the CNC computer program 10 operates under the Windows™ operating system manufactured by Microsoft Corporation. However, the CNC computer program 10 is not limited to the aforementioned hardware and software environment. It would be clear to those skilled in the art, other types of computers and operating systems, such as those manufactured by Apple, Inc., could be used within the spirit and scope of the invention. Alternatively, the computer program 10 could be integrated with a controller of the CNC machine.

Figure 2:
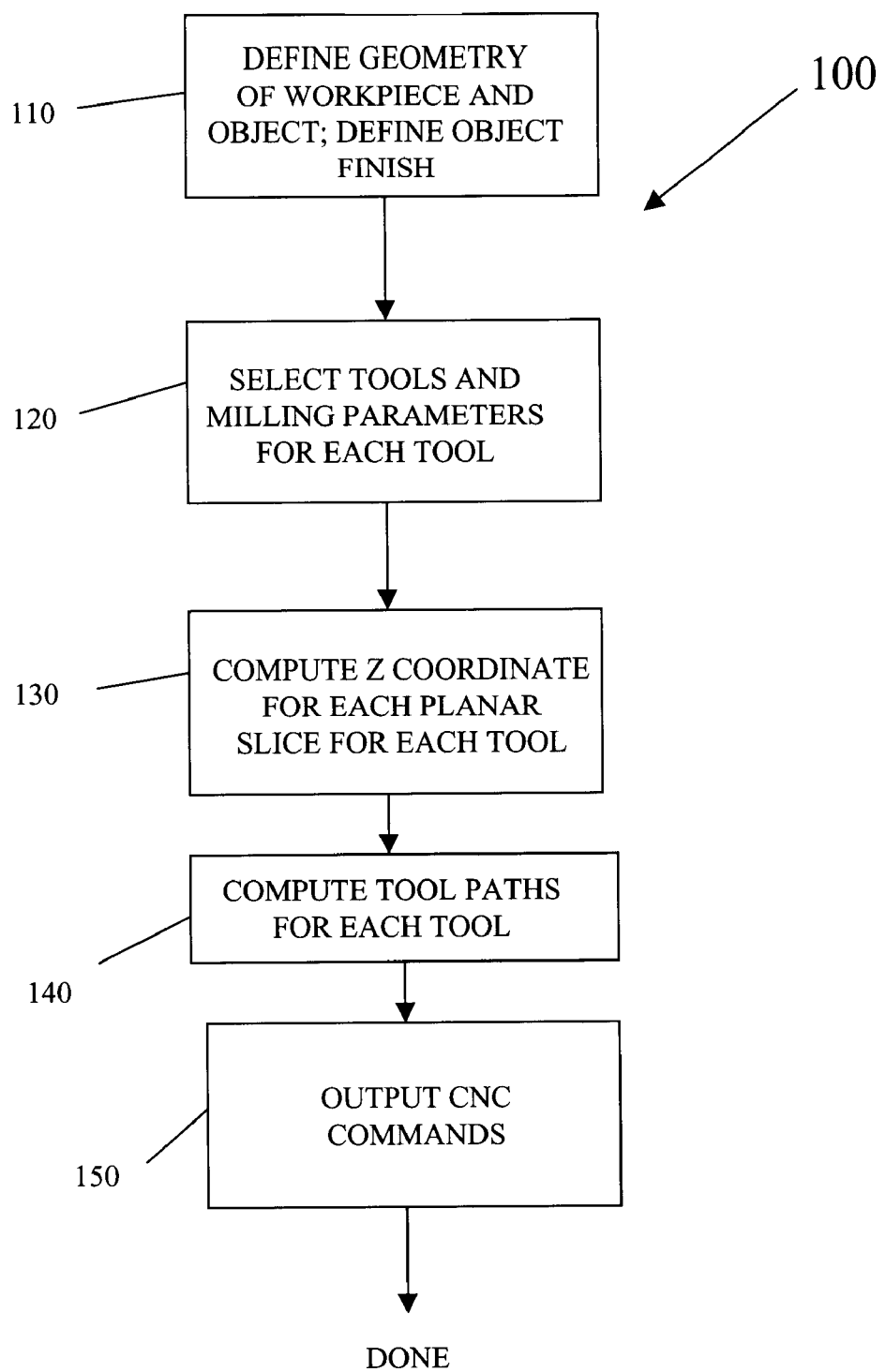
FIG. 2 is a flow diagram of the CNC computer program shown in FIG. 1 comprising steps 110–150.
Figure 3:
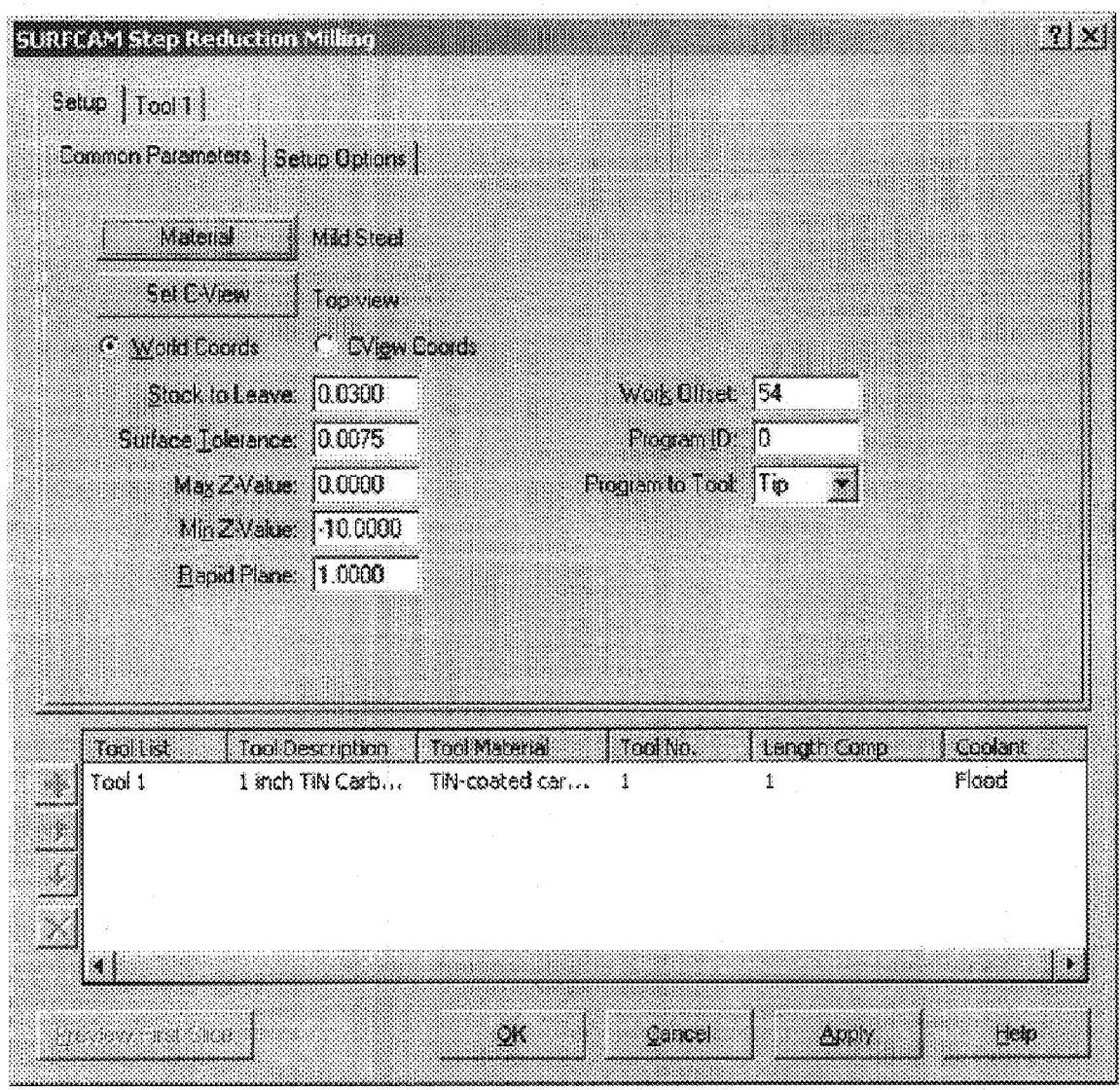
FIG. 3 shows a graphical user input setup menu for inputting and displaying common parameters.
Figure 4:
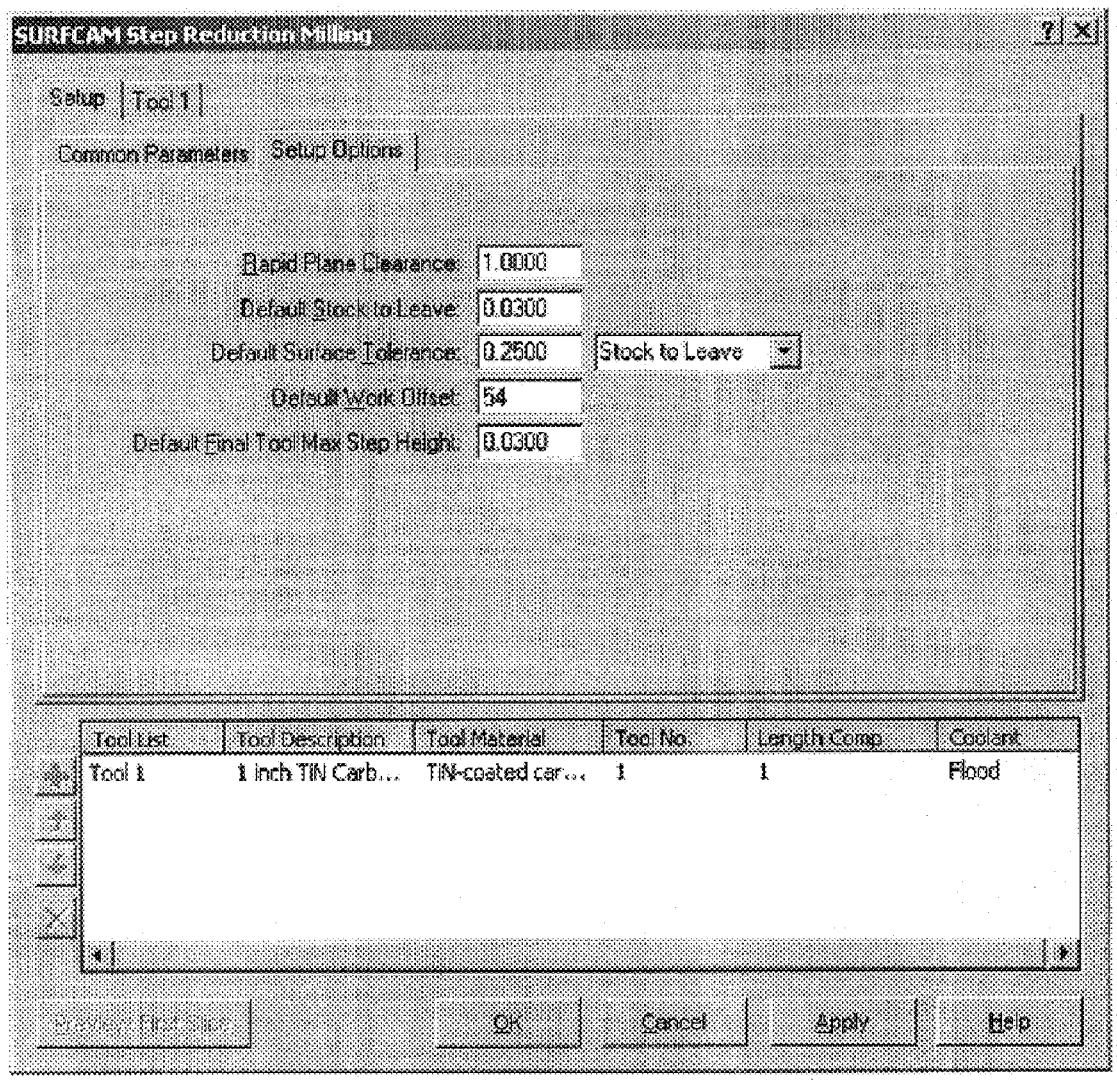
FIG. 4 shows a graphical user menu for inputting and displaying setup options.

Referring now to FIG. 2 there is shown a preferred process 100 for machining the object from the workpiece in accordance with the present invention. At step 110, three dimensional models of the object and the workpiece are produced based on user input and/or input from 2D and 3D input devices. Preferably, the models are produced by the computer aided design (CAD) computer subprogram 12. Preferably, the object model provides coordinates of a boundary in the workpiece which corresponds to the desired finish geometry of the workpiece. The boundary establishes a volume within which milling of the workpiece takes place. Preferably, the boundary, in combination with a Stock-to-Leave parameter ensures that the rough milling does not intrude upon the finish geometry of the finished workpiece. Methods for forming the models of the workpiece and the object are well known to those skilled in the art and are not repeated here for the sake of brevity.

Preferably, with the exception of generating the object and the workpiece models by the CAD subprogram 12, the process 100 is executed by the CAM subprogram 18. In addition to generating the models of the workpiece and of the object, step 110 includes inputting certain parameters that relate: (1) to the CNC machine, (2) to the workpiece dimensions and (3) to the workpiece material. Such parameters may be: (1) directly input by a user using on-screen input dialog boxes, (2) predetermined by default values stored in the CNC computer program 10, or directly from the CAD subprogram 12 based on the workpiece and object models. For example, in the preferred embodiment, a maximum Z value (i.e. coordinate) of the workpiece and a minimum Z value of the workpiece are computed based on the dimensions of the object model produced by the CAD subprogram 12. Other parameters such as the desired surface tolerance on the finished object and the amount of stock to leave on the workpiece for the finishing process at the conclusion of the rough milling process are provided as default values, which may be overridden by the user through the on-screen input dialog boxes.

At step 120, the user selects the tools to be used for rough milling of the workpiece. In the preferred embodiment of the invention, the tools are selected by the user through the on-screen dialog boxes shown in FIGS. 3–9. Preferably the CAM software subprogram 18 includes a tool database to facilitate the tool selection step 120. Where a tool to be used is not in the database, the CNC computer program 10 provides for defining a new tool and for parameters associated with the tool and for adding the information to the tool database.

The tool selection step 120 also includes provisions for establishing milling parameters to be used with each tool selected for rough milling. In the preferred embodiment, the milling parameters associated with each tool are shown in FIGS. 3–9. The definition of the terms shown in FIGS. 3–9 which are not defined elsewhere in the specification are well known to those skilled in the art and are therefore not defined here, for the sake of brevity.

Figure 5:
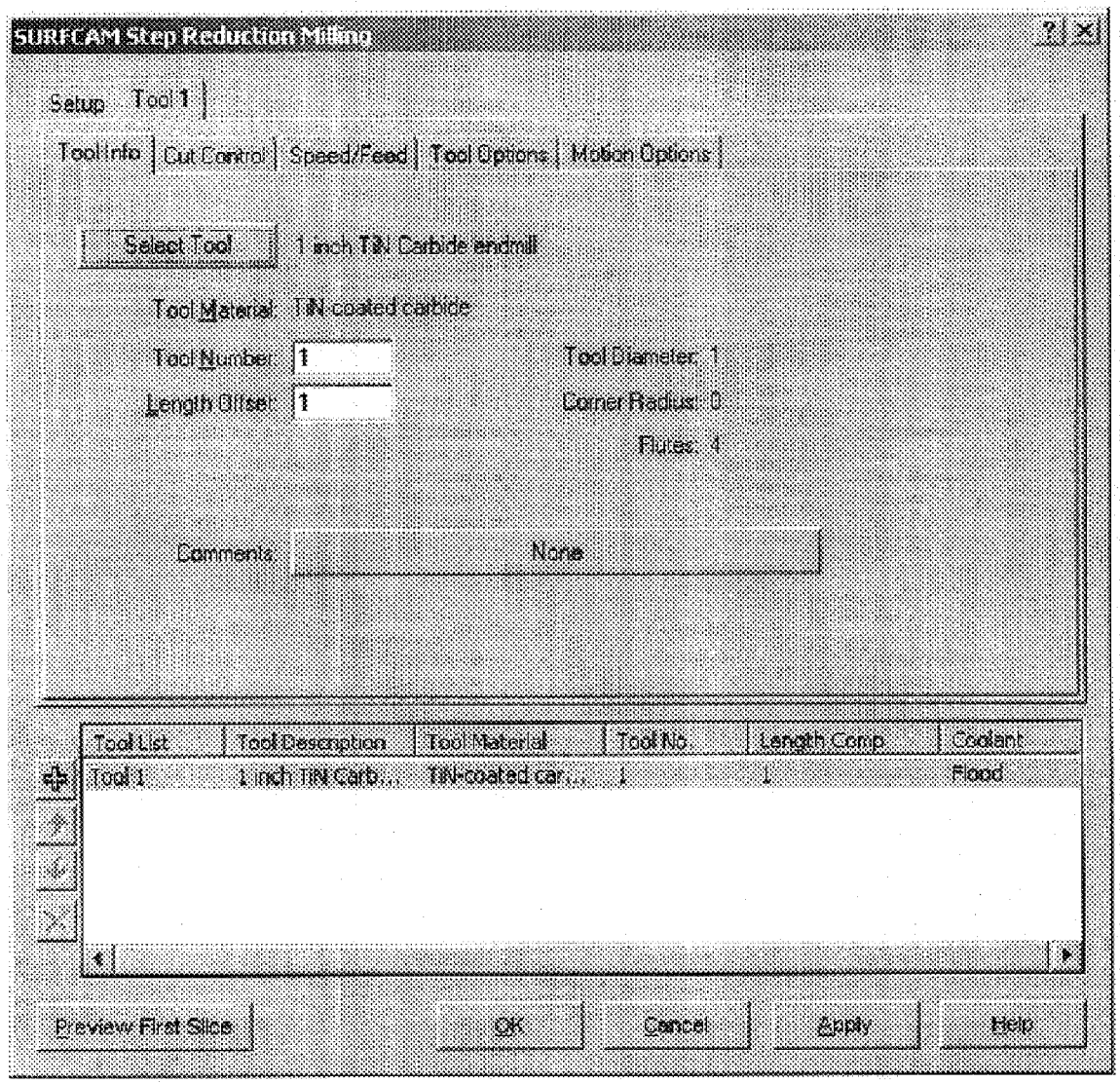
FIG. 5 shows a graphical user menu for inputting and displaying tool information.
Figure 6:
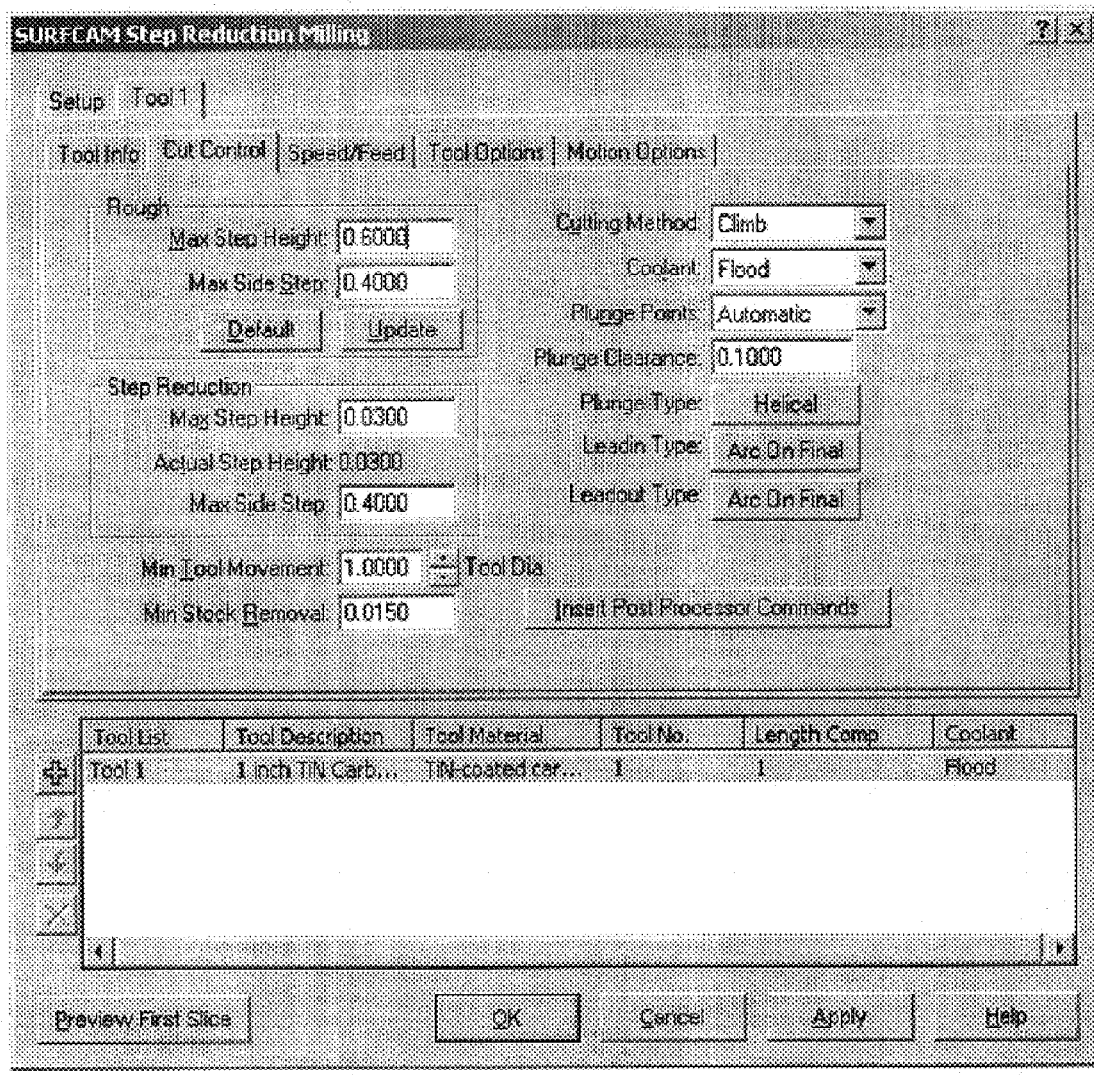
FIG. 6 shows a graphical user menu for inputting and displaying cut control parameters for tool 1.
Figure 7:
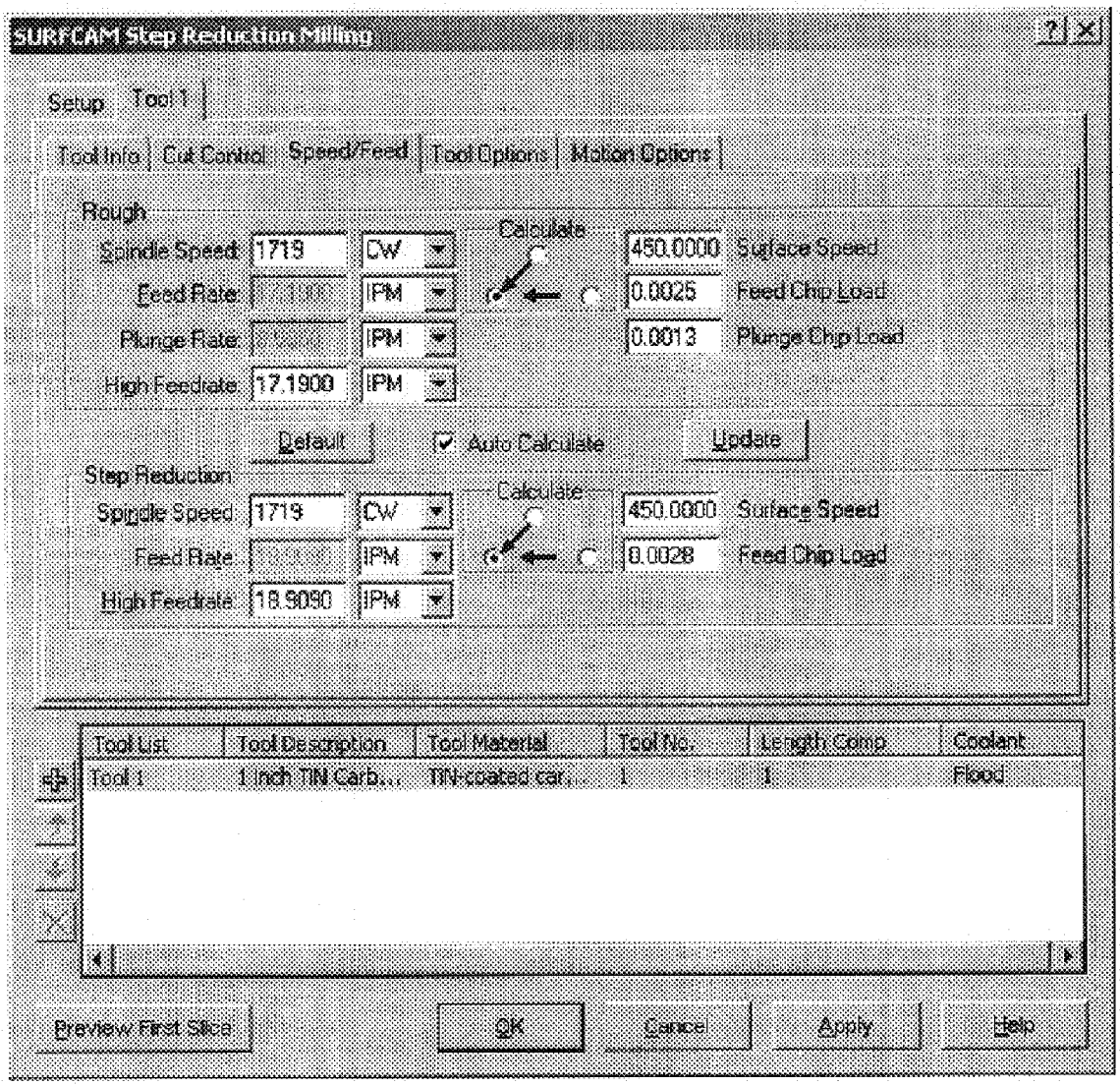
FIG. 7 shows a graphical user menu for inputting and displaying speed/feed control parameters, for tool 1.
Figure 8:
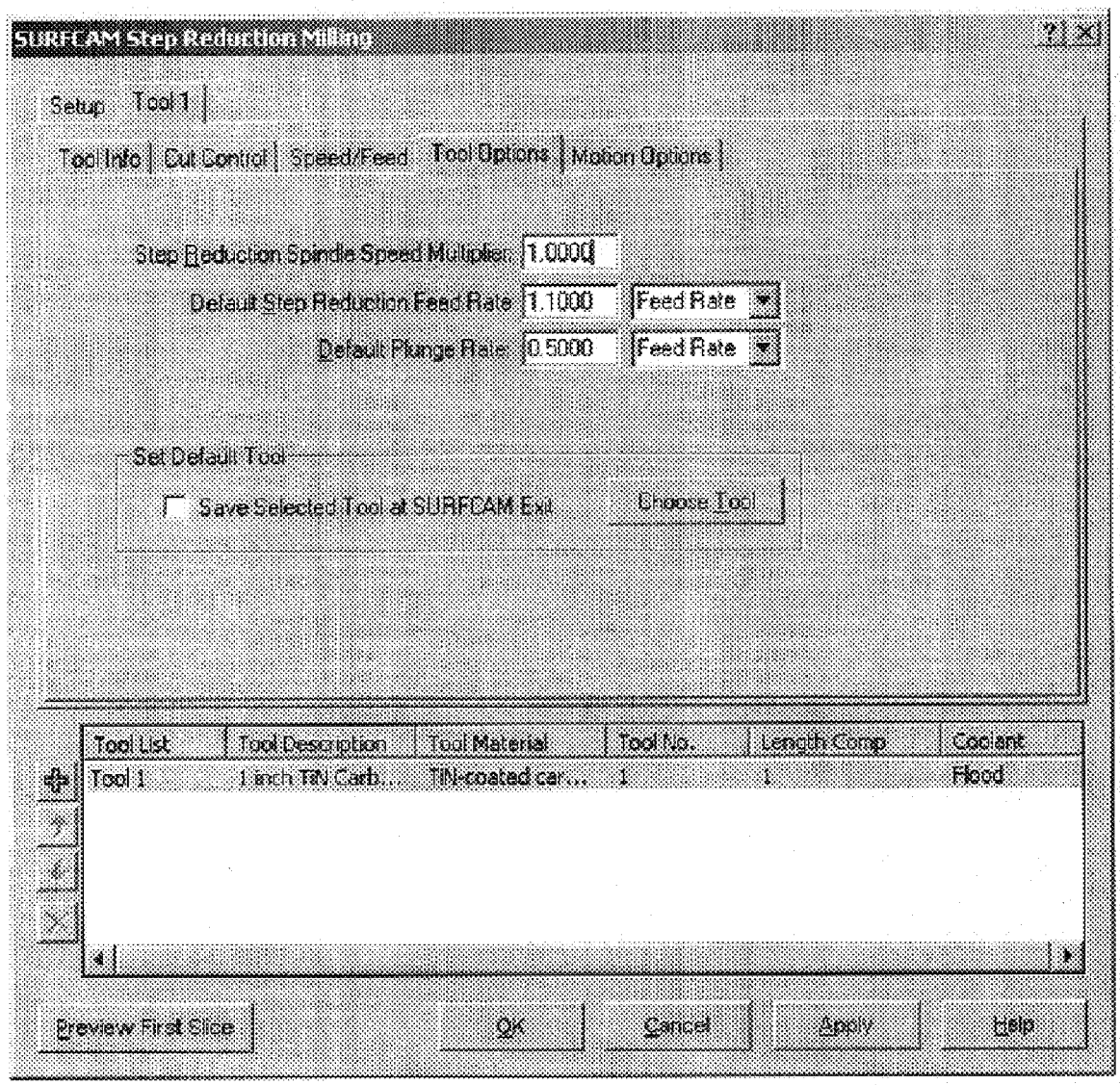
FIG. 8 shows a graphical user menu for inputting and displaying tool options for tool 1.
Figure 9:
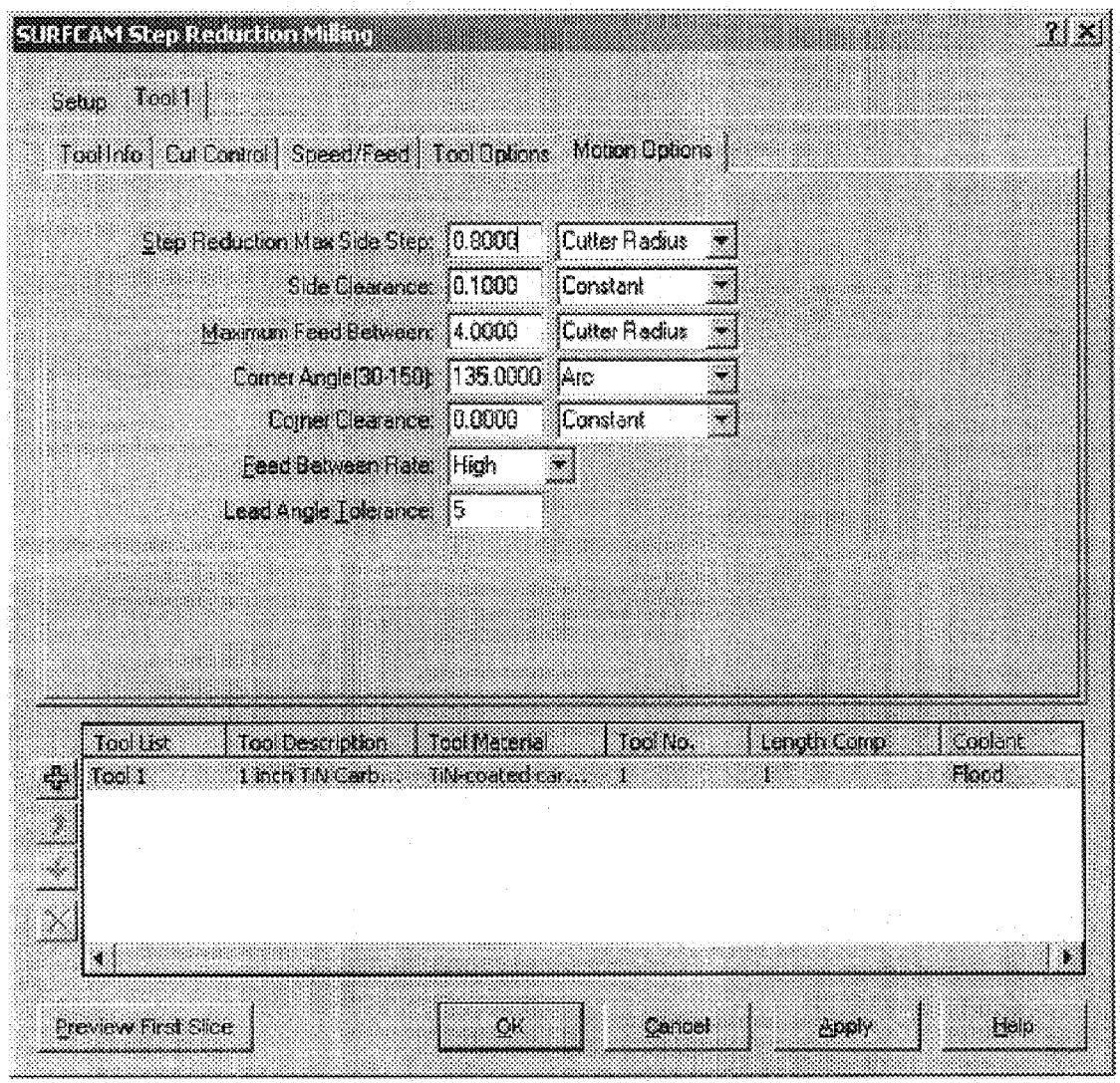
FIG. 9 shows a graphical user menu for inputting and displaying motion option parameters for tool 1.

The CNC computer program 10 includes a capability of displaying a three dimensional image of the workpiece model and of the object model using graphical display techniques which are well known to those in the art. In the preferred embodiment, the user also has the option of having the CNC computer program 10 display the three dimensional image of the workpiece which shows material to be removed by milling the workpiece at the highest Z coordinate for a selected tool. The preview capability is available during the programming process following the computation of the Z coordinates for the selected tool (step 130) and prior to the computation of the tool paths (step 140) for every slice and every tool (see below) by selecting the preview first slice button on the tool info dialog box of the selected tool (FIG. 5). The planar slice is displayed as a shaded two-dimensional plane located at the Z coordinate of the planar slice. Slice previewing is particularly useful for conducting "what if" scenarios for tool and tool parameter selection.

Referring again to FIG. 2, there is shown a preferred method for generating commands for controlling a computer numerical control machine comprising the steps of: (1) determining a first set of Z coordinates to be used as a basis for machining each planar slice belonging to a first set of planar slices with a first tool and (2) determining a second set of Z coordinates to be used as a basis for machining each planar slice belonging to a second set of planar slices with the first tool, where the second set of the planar slices is partitioned into at least one subset, each of which corresponds to a different pair of adjacent Z coordinates belonging to the first set of Z coordinates, and where a distance between the Z coordinates of each subset is a unit fraction of a distance between the Z coordinates of the pair of adjacent Z coordinates corresponding to the at least one subset.

At step 130, a Z coordinate is computed for each slice of a planar slice set $\{S_n\}$ for each selected tool n=1 to N. The planar slice set, $\{S_n\}$, is made up of fixed height (FH) slices, step reduction (SR) slices, full (FS) slices and step reduction-M (SRM) slices, as described below.

Figure 10:
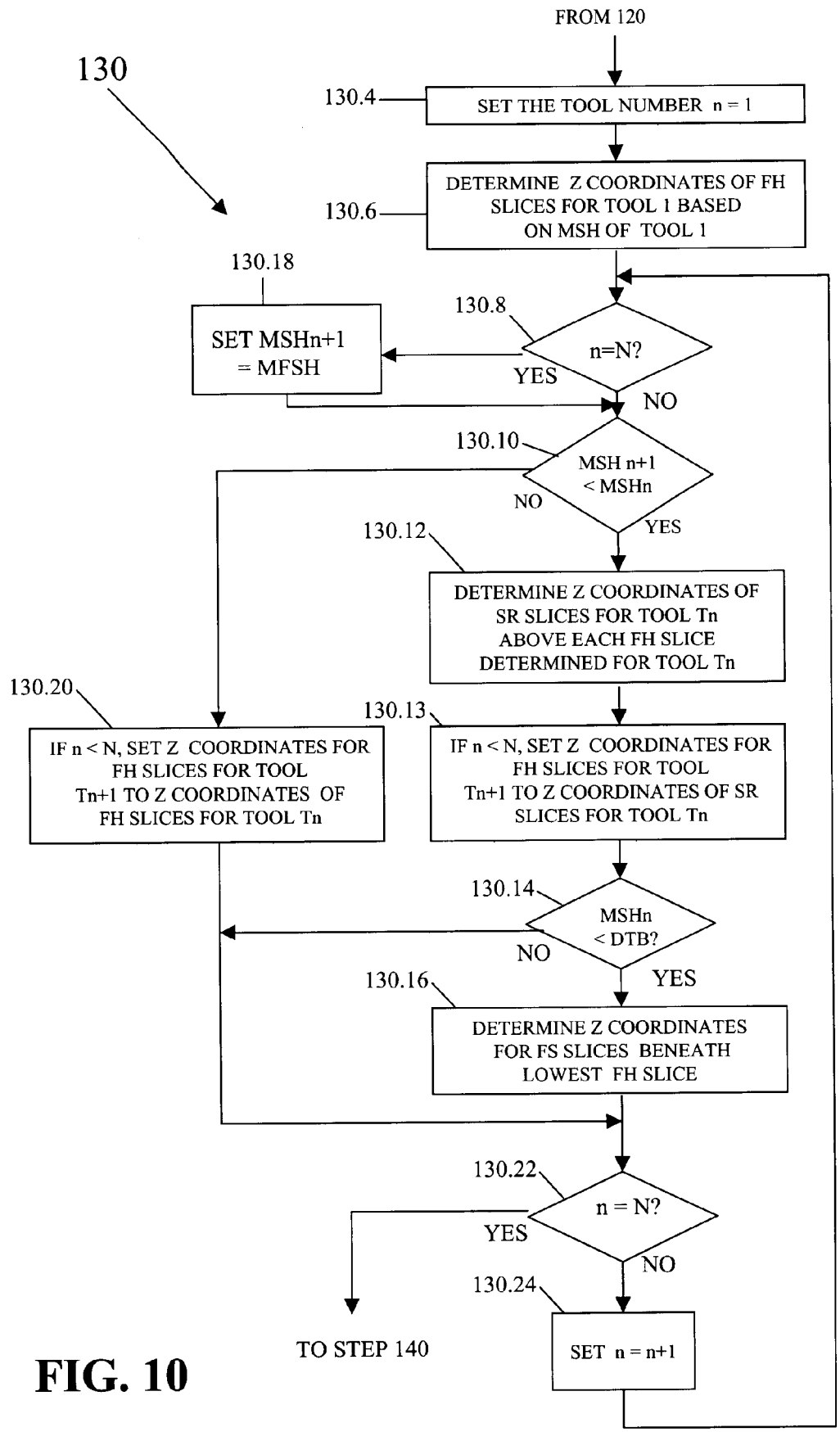
FIG. 10 is a more detailed flow diagram of step 130 shown in FIG. 2.

Step 130 is shown in more detail in FIG. 10. At step 130.4, the CNC computer program 10 sets the current tool number parameter n, equal to 1. At step 130.6, a Z coordinate of the first FH slice $S_{1,1}$ for the first tool $T_1$ is computed at a Maximum Step Height (MSH) distance for tool $T_1$ (see FIG. 6) below the Maximum Z Value of the workpiece. The Z coordinates of additional FH slices below the first (highest) slice are then computed. Preferably, the Z coordinates of the FH slices are computed by the CNC computer program 10 to be to within six decimal places, resulting in the step heights (i.e. distance between adjacent Z coordinates) of the FH (and the SR, FS and SRM) planar slices to be substantially uniform. Preferably, the Z coordinate of each additional planar slice is set at the MSH distance for tool $T_1$ below the prior slice, until the last slice M for tool $T_1$ is reached. In this manner, step 130.6 creates a subset of Z coordinates for the planar slices $\{S_{1,m=1 \text{ to } M}\}$, for tool $T_1$, where slice $S_{1,M}$ has the lowest Z coordinate and $S_{1,M}$ represents the final slice in the subset of FH slices for tool $T_1$. It is preferred to make the step sizes equal to the MSH of tool $T_1$.

In the preferred embodiment of the CNC computer program 10, the step heights of the FH slices are a constant value and equal to the MSH of tool $T_1$. The MSH of each tool, including tool $T_1$, is determined from data in the tool database. However, a user may alter the MSH of each tool at will, thereby altering the step heights of the FH slices to a more suitable value. Further, the step sizes of FH slices over the range of m=1 to M may be made unequal and still be within the scope of the invention.

At step 130.8, the current tool number, n is compared with the tool number of the final tool N. If the current tool number n is not the number of the final tool N, the MSH of the nth tool is compared with the MSH of the n+1 tool at step 130.10. If the MSH of the n+1 tool is less than the MSH of the nth tool, the Z coordinates of step reduction (SR) slices for each subset corresponding to each slice computed for the nth tool and located above the Z coordinate of each slice are computed at step 130.12. In the preferred embodiment, the distance between the Z coordinate of each step reduction slice, for a given tool $T_n$, is equal to the largest unit fraction, (e.g. ½, ⅓, ¼, . . . ), of the distance between the Z coordinates of the current slices for the $T_n$ tool that is also smaller than the maximum step height (MSH) parameter of the next successive tool $T_{n+1}$. Stated another way, for each FH slice for tool n, where the thickness of each FH slice is computed on the basis of the maximum step height $MSH_n$ for tool $T_n$, the distance between step reduction slices is computed as the current depth of cut of tool $T_n$, divided by the rounded up integer of the ratio of the depth of cut $MSH_n$ for tool $T_n$ divided by the maximum step height $MSH_{n+1}$ for tool $T_{n+1}$. Consequently, the Z coordinates of the step reduction (SR) slices within each subset are equally spaced within the upper and lower Z coordinates of the corresponding FH planar slice.

At step 130.13, if n<N, the CNC computer program 10, sets the Z coordinates for the FH slices for tool $T_{n+1}$ to the Z coordinates of the just computed SR slices for tool $T_n$. If n=N, the Z coordinates for the FH slices for the tool $T_{n+1}$ are not computed. If at step 130.10, the MSH of the tool $T_{n+1}$ is determined to be not less than the MSH of tool $T_n$, at step 130.20, if n<N, the Z coordinates for the FH slices for tool $T_{n+1}$ are set to the Z coordinates of the FH slices for tool $T_n$ and tool $T_n$ does not perform step reduction passes. If n=N, the Z coordinates for the FH slices for the tool $T_{n+1}$ are not computed.

The distance between the Z coordinate of the lowest (most negative) FH or SR planar slice and the lowest Z component of the workpiece topology to be cut (minus the Stock-to-Leave value) is hereinafter referred to as the depth to bottom (DTB). If the MSH of the first or of any succeeding tool does not divide evenly into the DTB, the distance between the Z coordinate of the lowest planar slice and the lowest Z component of the workpiece will not equal the distance between the planar slices above the lowest value FH or SR planar slice. The distance may range from very small to only a marginally smaller value than the MSH of the tool. At step 130.14, the MSH of the current (nth) tool is compared with the DTB. If the MSH of the nth tool is less than the DTB of the lowest planar slice computed for n−1 tool, additional planar slice Z coordinates are computed between the lowest planar slice computed for the n−1 tool and the lowest Z component of the workpiece topology to be cut, using the MSH of the nth tool (step 130.16). The planar slices below the lowest FH or SR planar slice are referred to as full (FS) slices. If the MSH of the nth tool is not less than the DTB, step 130.16 is skipped.

At step 130.22, the number of the current tool, n, is compared with the number of the final tool. If the current tool is not the final tool, the value of n is incremented at step 130.24. The Z coordinates established for the previously created SR slices to be machined by tool $T_n$, now become the basis for computing the unit fraction for the SR slices to be machined by tool $T_{n+1}$. Accordingly, the steps 130.8, 130.10, 130.12, 130.13, 130.14 130.16, 130.22 and 130.24 are then repeated until the Z coordinate is computed for each slice to be cut by every tool including the Nth tool.

As described above, the depth of cut for the step reduction (SR) slices for the nth tool is based on the MSH of the n+1 tool. Where the current tool, n, is the final tool N, the values of the Z coordinates are based on the value of Final Tool Maximum Step Height (FTMSH) parameter (FIG. 4) for the final tool established by the user at the time of the tool/milling parameter selection (step 120), based on achieving a surface compatible with the first finishing tool. Alternatively, an arbitrary value may be used to control the depth of cut of the final step reduction slices, or the user may specify the MSH of the initial finishing tool. Accordingly, where at step 130.8 it is determined that the current tool is the final tool, N, the value of $MSH_{n+1}$ is set to the FTMSH parameter at step 130.18. The SR slice Z coordinates computed with the FTMSH parameter are referred to, in particular, as step reduction-M (SRM) slices.

At the conclusion of step 130, the CNC computer program 10 advances to step 140. At step 140, the tool paths, comprising a series of X, Y coordinate data for each selected tool for each FH slice, SR slice, FS slice and SRM slice are computed using tool path computation algorithms that are well known in the art. The coordinate data for each planar slice has associated with it, corresponding tool data indicating which tool is to be used to cut the planar slice. In the preferred embodiment, the tool paths of the set of FH, SR, FS and SRM slices are stored as a single, sorted array arranged in descending Z order. As would be clear to those skilled in the art, the tool paths could be stored differently, such as in separate arrays for each tool without departing from the spirit and scope of the invention.

Two types of tool paths are computed at step 140, contour paths and pocketing paths. Pocketing tool paths are used as a basis for cutting an entire planar slice at a Z coordinate where no previous tool has previously cut material. Consequently, pocketing tool paths are used for rough milling FH and FS levels. The pocketing tool paths are computed for the first tool using FH slice Z coordinates found for the first tool in step 130.6 and for tools having a tool number greater than one, using the Z coordinate values computed at step 130.20. The paths for the FS slices are computed using the Z coordinate values computed at step 130.16. Contour tool paths are used as a basis for cutting the remaining stock of a slice cut by a previous tool. Contour tool paths are computed for each tool, n, using the Z coordinates of the smallest step sizes (i.e. either FH, SR, SRM or FS) found for the n−1 tool. The contour tool paths are used to clean out corners left by the n−1th tool, using the nth tool. The step reduction tool paths are computed for each tool for which step reduction coordinates were computed at step 130.12. The paths for the SRM slices use the Z coordinates computed at step 130.12 based on the FTMSH at step 130.12.

The tool paths for each tool at each Z coordinate are based on a part boundary and a material boundary. The part boundary at a specific Z coordinate is the set of X,Y coordinates formed by the intersection of the planar slice at the specific Z coordinate and the object model, adjusted for the Stock-to-Leave parameter. The material boundary at a particular Z coordinate is the set of part boundary X, Y coordinates at the Z coordinate of the next lower FH slice, projected vertically to the Z coordinate of the specific slice. Consequently, the amount of material to be removed is based on simply the difference between the part boundary and the material boundary at the specific Z coordinate. One skilled in the art would recognize that the paths determined in step 140 are based on the coordinates of earlier computed planar slices at the same or proximate Z coordinates and are not based on a computation of the three dimensional remaining volume of the workpiece relative to the object model. The specific algorithms for calculating the contour and pocketing tool paths based on the material boundaries and part boundaries are well known in the art and are not repeated here for the sake of brevity.

Figure 11:
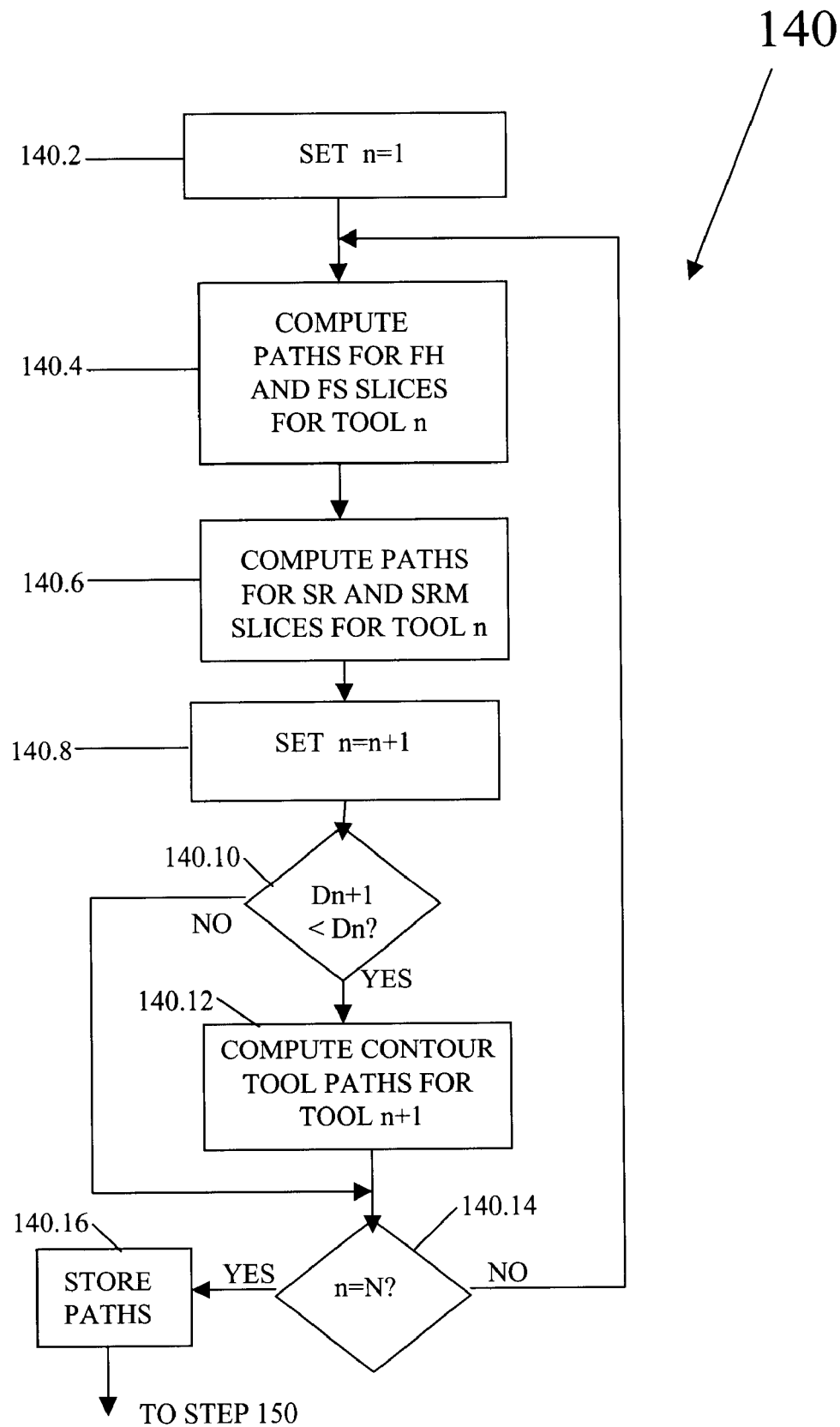
FIG. 11 is a more detailed flow diagram of step 140 shown in FIG. 2.

Referring now to FIG. 11, the details of step 140 are described. At step 140.2, the CNC computer program 10 sets the tool number, n to a value of 1. At step 140.4, the tool paths are computed for each FH slice for the first tool. At step 140.6, the tool paths are computed at each SR level for subsequent machining by the first tool. At step 140.8, the tool number is set to the next tool, $T_{n+1}$. At step 140.10, the tool diameter of the n+1 tool is compared with the diameter of the nth tool. If the diameter of the n+1 tool, $T_{n+1}$ is less than the diameter of the nth tool, $T_n$, at step 140.12, the contouring tool paths are computed for the $T_{n+1}$ tool for cleaning out the corners of the slices milled by the $T_n$ tool.

At step 140.14, the current tool number is compared with the final tool number N. If the current tool number is less than N, the steps 140.4 through 140.14 are repeated until a tool path for each planar slice is computed. Where N>1 and n>1, step 140.4 includes computing the pocketing paths for both FH and FS slices, and step 140.6 includes computing the contour paths for both SR and SRM slices. When n=N, step 140 concludes by storing all of the paths for all the tools in the non-volatile memory (step 140.16).

Not all slices will necessarily have a tool path computed for them, either with subsequent tools, or on the SR slices of the same tool. The decision to compute a tool path depends on the amount of material that needs to be removed, the Minimum-Stock-to-Remove parameter and the minimum tool movement parameter. If the amount of material that needs to be removed is less than or equal to the Minimum-Stock-to-Remove parameter or the Minimum Tool Movement parameter, either on the whole slice or a portion thereof, no tool path will be applied to that portion of the slice. Consequently, some slices will get a "full" contour path, some will get a "partial" contour path (or even multiple partial passes), and other slices may get no contour path. Indeed, depending on the amount of material remaining, which can vary widely on a given slice, more than one full contour path could be required, or even a combination of one or more full paths and one or more partial paths.

At step 150, (see FIG. 2), the CNC software program 10 output performs a milling operation on the workpiece by creating and thereafter outputting CNC commands to the CNC machine for moving each selected cutting tool in a preferred order. Preferably, the CNC commands are output by the post-processing subprogram 20 based on commands created by the CAM subprogram 18. Preferably, the post-processing subprogram 20 converts the output of the CAM subprogram 18 to the CNC commands used by the particular CNC machine for controlling the motion of the cutting tools and/or the workpiece. In the preferred embodiment, a database of CNC conversion instructions for a variety of CNC machines is part of the CNC computer subprogram 10.

Figure 12:
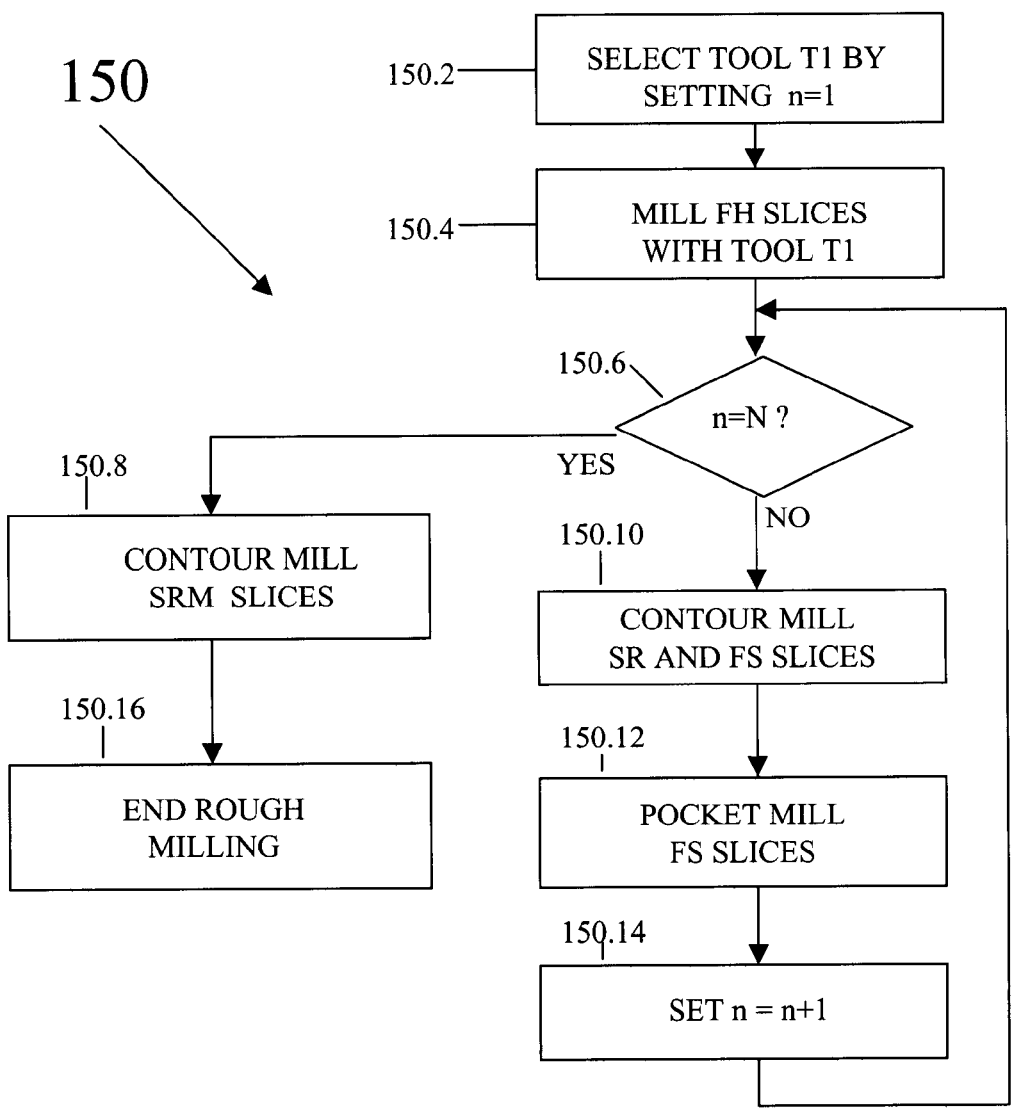
FIG. 12 is a more detailed flow diagram of step 150 shown in FIG. 2.

FIG. 12 describes step 150 in more detail. At step 150.2 the CNC computer program 10 selects the first tool $T_1$ for machining the workpiece. At step 150.4, a pocketing pass (also referred to as Z level roughing, volume machining or volume roughing) at the specified feed rate is performed at each Z level planar slice with tool $T_1$. At step 150.6, the current tool number is compared with the tool number of the final tool. If the current tool is equal to the final tool number, the SRM slices are milled at step 150.8 and the rough milling process ends at step 150.18.

If the current tool is not the final tool, step 150 continues with contour milling (also referred to as profile milling or profiling) the SR and any previously pocket milled FS slices (step 150.10) using tool $T_n$. At step number 150.12, the FS slices are pocket milled with tool $T_n$. At step 150.14, the tool number is incremented by one. Steps 150.6 to 150.14 are then repeated until the tool number reaches the final tool number N. Preferably, the feed rate of each tool which mills a step reduction slice having a depth of cut less than the MSH of the respective tool is automatically increased over the rate specified for milling a slice at the MSH of the tool. More preferably, the feed rate is based on the ratio of the distance between adjacent Z coordinates of the planar slices in each subset of slices that is being machined and the maximum step height of the tool machining the slices. Preferably, the slices are machined in descending Z order. However, the slices could also be machined in ascending Z order and still be within the spirit and scope of the invention.

In use, a user employs the dialog boxes shown in FIGS. 3–9 to select the tools to be used for machining a workpiece. The user may select all the tools at one time, and compute the Z coordinates for the tools (step 130) and preview the result of machining by a selected tool by previewing the first slice for each tool prior to initiating the computation of the entire set of the tool paths. Alternatively, the operator may select the tools, one at a time and preview the results, prior to selecting the next tool.

As will be appreciated by those skilled in the art, the present invention is an improved method for rough milling a workpiece. The improved method utilizes an iterative process for reducing the height of steps created by Z level rough milling, resulting in a series of steps that are substantially uniform in height and having values of the X, Y and Z coordinates of the tool paths accurately known. Since the coordinate values of the steps are accurately known the actual boundary of remaining material, at any given point in time, is unambiguously known. Consequently, the present invention does not require a separate calculation of the volume of material remaining after each cut in order to determine parameters for computing the next cut.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes can be made to the embodiments described above without departing from the broad inventive concept thereof. The present invention is thus not limited to the particular embodiments disclosed, but is intended to cover modifications within the spirit and scope of the present invention.

What is claimed is:

1. An automated computer-implemented method for generating commands for controlling a computer numerical control machine to fabricate an object from a workpiece, said method comprising the steps of:
    determining a first set of Z coordinates for machining a first set of Z level planar slices with a first tool; and
    determining a second set of Z coordinates for machining a second set of Z level planar slices with the first tool, the second set of Z coordinates being partitioned into at least one subset, each at least one subset corresponding to a pair of adjacent Z coordinates belonging to the first set of Z coordinates, a distance between the Z coordinates of each corresponding subset being a unit fraction of a distance between the Z coordinates of the pair of adjacent Z coordinates.

2. The method according to claim 1, wherein the distances between the adjacent Z coordinates belonging to the first set are substantially equal.

3. The method according to claim 2, wherein the distances between the adjacent Z coordinates belonging to the first set are substantially equal to a maximum step height parameter of the first tool.

4. The method according to claim 3, wherein a distance between each of the adjacent Z coordinates of the at least one subsets is based on a maximum step height parameter of a second tool when the maximum step height of the second tool is smaller than the maximum step height of the first tool.

5. The method according to claim 4, wherein the unit fraction is the largest unit fraction that results in the distance between the adjacent Z coordinates of each of the at least one subsets being smaller than the maximum step height parameter of the second tool.

6. The method according to claim 1, further including the step of creating tool paths for machining the first set of Z level planar slices and the second set of Z level planar slices using the first tool.

7. The method according to claim 6, wherein the second set of Z level planar slices is machined at a higher feed rate than the first set of Z level planar slices.

8. The method according to claim 7, wherein the feed rate for machining the second set of Z level planar slices is based on a ratio of the distance between the adjacent Z coordinates of each subset of the second set of Z coordinates and a maximum step height of the first tool.

9. The method according to claim 6, wherein the tool paths for machining the second set of planar slices are based on a material boundary of the first set of planar slices, and are not based on a remaining volume of the workpiece.

10. The method according to claim 1, further including the step of determining a third set of Z coordinates for machining a third set of Z level planar slices with a second tool, the third set of Z coordinates being partitioned into at least one subset, each at least one subset corresponding to a pair of adjacent Z coordinates belonging to the second set of Z coordinates, the distance between each of the Z coordinates belonging to each of the at least one subsets being a unit fraction of the distance between the Z coordinates of the adjacent Z coordinates corresponding to the at least one subset.

11. The method according to claim 10, wherein a distance between each of the adjacent Z coordinates of each of the at least one subsets is based on a maximum step height parameter of a third tool when the maximum step height of the third tool is smaller than the maximum step height of the second tool.

12. The method according to claim 11, wherein the unit fraction is the largest unit fraction that results in the distance between the adjacent Z coordinates of each of the at least one subsets being smaller than the maximum step height parameter of the third tool.

13. The method according to claim 1, further including the step of creating tool paths for machining the second set of Z level planar slices and the third set of Z level planar slices using the second tool.

14. The method according to claim 13, wherein the third set of Z level planar slices is machined at a higher feed rate than the second set of Z level planar slices.

15. The method according to claim 14, wherein the feed rate for machining the third set of Z level planar slices is based on a ratio of the distance between the adjacent Z coordinates of each subset of the third set of Z coordinates and a maximum step height of the second tool.

16. The method according to claim 13, wherein the tool paths for machining the third set of planar slices are based on a material boundary of the second set of planar slices and are not based on a remaining volume of the workpiece.

17. A method for creating a three dimensional image of a workpiece which shows material to be milled by a selected tool comprising the steps of:
    selecting the tool;
    computing a Z level planar slice at a highest Z level coordinate at which the workpiece is to be milled by the selected tool; and
    displaying the three dimensional image of the workpiece with the planar slice distinguished from the image of the workpiece, wherein the image of the workpiece with the planar slice distinguished from the image of the workpiece is created prior to computing the entirety of tools paths for fabricating the workpiece.

18. An automated computer-implemented apparatus for generating commands for controlling a computer numerical control machine to fabricate an object from a workpiece, said apparatus comprising:
    means for determining a first set of Z coordinates for machining a first set of Z level planar slices with a first tool; and
    means for determining a second set of Z coordinates for machining a second set of Z level planar slices with the first tool, the second set of Z coordinates being partitioned into at least one subset, each at least one subset corresponding to a pair of adjacent Z coordinates belonging to the first set of Z coordinates, a distance between the Z coordinates of each corresponding subset being a unit fraction of a distance between the Z coordinates of the pair of adjacent Z coordinates.

19. The apparatus according to claim 18, wherein the distances between the adjacent Z coordinates belonging to the first set are substantially equal.

20. The apparatus according to claim 19, wherein the distances between the adjacent Z coordinates belonging to the first set are substantially equal to a maximum step height parameter of the first tool.

21. The apparatus according to claim 20, wherein a distance between each of the adjacent Z coordinates of the at least one subsets is based on a maximum step height parameter of a second tool when the maximum step height of the second tool is smaller than the maximum step height of the first tool.

22. The apparatus according to claim 21, wherein the unit fraction is the largest unit fraction that results in the distance between the adjacent Z coordinates of each of the at least one subsets being smaller than the maximum step height parameter of the second tool.

23. The apparatus according to claim 18, further including the means for creating tool paths for machining the first set of Z level planar slices and the second set of Z level planar slices using the first tool.

24. The apparatus according to claim 23, wherein the second set of Z level planar slices is machined at a higher feed rate than the first set of Z level planar slices.

25. The apparatus according to claim 24, wherein the feed rate for machining the second set of Z level planar slices is based on a ratio of the distance between the adjacent Z coordinates of each subset of the second set of Z coordinates and a maximum step height of the first tool.

26. The apparatus according to claim 23, wherein the tool paths for machining the second set of planar slices are based on a material boundary of the first set of planar slices and are not based on a remaining volume of the workpiece.

27. The apparatus according to claim 18, further including the means for determining a third set of Z coordinates for machining a third set of Z level planar slices with a second tool, the third set of Z coordinates being partitioned into at least one subset, each at least one subset corresponding to a pair of adjacent Z coordinates belonging to the second set of Z coordinates, the distance between each of the Z coordinates belonging to each of the at least one subsets being a unit fraction of the distance between the Z coordinates of the adjacent Z coordinates corresponding to the at least one subset.

28. The apparatus according to claim 27, wherein a distance between each of the adjacent Z coordinates of each of the at least one subsets is based on a maximum step height parameter of a third tool when the maximum step height of the third tool is smaller than the maximum step height of the second tool.

29. The apparatus according to claim 28, wherein the unit fraction is the largest unit fraction that results in the distance between the adjacent Z coordinates of each of the at least one subsets being smaller than the maximum step height parameter of the third tool.

30. The apparatus according to claim 18, further including the means for creating tool paths for machining the second set of Z level planar slices and the third set of Z level planar slices using the second tool.

31. The apparatus according to claim 30, wherein the third set of Z level planar slices is machined at a higher feed rate than the second set of Z level planar slices.

32. The apparatus according to claim 31, wherein the feed rate for machining the third set of Z level planar slices is based on a ratio of the distance between the adjacent Z coordinates of each subset of the third set of Z coordinates and a maximum step height of the second tool.

33. The apparatus according to claim 30, wherein the tool paths for machining the third set of planar slices are based on a material boundary of the second set of planar slices and are not based on a remaining volume of the workpiece.

34. An apparatus for creating a three dimensional image of a workpiece which shows material to be milled by a selected tool comprising the steps of:
  selecting the tool;
  computing a Z level planar slice at a highest Z level coordinate at which the workpiece is to be milled by the selected tool; and
  displaying the three dimensional image of the workpiece with the planar slice distinguished from the image of the workpiece, wherein the image of the workpiece with the planar slice distinguished from the image of the workpiece is created prior to computing the entirety of tools paths for fabricating the workpiece.

35. An article of manufacture for generating commands for controlling a computer numerical control machine to fabricate an object from a workpiece, said article of manufacture comprising a computer readable medium holding computer executable instructions for performing a method comprising the steps of:
  determining a first set of Z coordinates for machining a first set of Z level planar slices with a first tool; and
  determining a second set of Z coordinates for machining a second set of Z level planar slices with the first tool, the second set of Z coordinates being partitioned into at least one subset, each at least one subset corresponding to a pair of adjacent Z coordinates belonging to the first set of Z coordinates, a distance between the Z coordinates of each corresponding subset being a unit fraction of a distance between the Z coordinates of the pair of adjacent Z coordinates.

36. The article of manufacture according to claim 35, wherein the distances between the adjacent Z coordinates belonging to the first set are substantially equal.

37. The article of manufacture according to claim 36, wherein the distances between the adjacent Z coordinates belonging to the first set are substantially equal to a maximum step height parameter of the first tool.

38. The article of manufacture according to claim 37, wherein a distance between each of the adjacent Z coordinates of the at least one subsets is based on a maximum step height parameter of a second tool when the maximum step height of the second tool is smaller than the maximum step height of the first tool.

39. The article of manufacture according to claim 38, wherein the unit fraction is the largest unit fraction that results in the distance between the adjacent Z coordinates of each of the at least one subsets being smaller than the maximum step height parameter of the second tool.

40. The article of manufacture according to claim 35, further including the step of creating tool paths for machining the first set of Z level planar slices and the second set of Z level planar slices using the first tool.

41. The article of manufacture according to claim 40, wherein the second set of Z level planar slices is machined at a higher feed rate than the first set of Z level planar slices.

42. The article of manufacture according to claim 41, wherein the feed rate for machining the second set of Z level planar slices is based on a ratio of the distance between the adjacent Z coordinates of each subset of the second set of Z coordinates and a maximum step height of the first tool.

43. The article of manufacture according to claim 40, wherein the tool paths for machining the second set of planar slices are based on a material boundary of the first set of planar slices and not based on a remaining volume of the workpiece.

44. The article of manufacture according to claim 35, further including the step of determining a third set of Z coordinates for machining a third set of Z level planar slices with a second tool, the third set of Z coordinates being partitioned into at least one subset, each at least one subset corresponding to a pair of adjacent Z coordinates belonging to the second set of Z coordinates, the distance between each of the Z coordinates belonging to each of the at least one subsets being a unit fraction of the distance between the Z coordinates of the adjacent Z coordinates corresponding to the at least one subset.

45. The article of manufacture according to claim 44, wherein a distance between each of the adjacent Z coordinates of each of the at least one subsets is based on a maximum step height parameter of a third tool when the maximum step height of the third tool is smaller than the maximum step height of the second tool.

46. The article of manufacture according to claim 45, wherein the unit fraction is the largest unit fraction that results in the distance between the adjacent Z coordinates of each of the at least one subsets being smaller than the maximum step height parameter of the third tool.

47. The article of manufacture according to claim 35, further including the step of creating tool paths for machining the second set of Z level planar slices and the third set of Z level planar slices using the second tool.

48. The article of manufacture according to claim 47, wherein the third set of Z level planar slices is machined at a higher feed rate than the second set of Z level planar slices.

49. The article of manufacture according to claim 48, wherein the feed rate for machining the third set of Z level planar slices is based on a ratio of the distance between the adjacent Z coordinates of each subset of the third set of Z coordinates and a maximum step height of the second tool.

50. The article of manufacture according to claim 47, wherein the tool paths for machining the third set of planar slices are based on a material boundary of the second set of planar slices and are not based on a remaining volume of the workpiece.

51. An article of manufacture for creating a three dimensional image of a workpiece which shows material to be milled by a selected tool, said article of manufacture comprising a computer readable medium holding computer executable instructions for performing a method comprising the steps of:

selecting the tool;

computing a Z level planar slice at a highest Z level coordinate at which the workpiece is to be milled by the selected tool; and displaying the three dimensional image of the workpiece with the planar slice distinguished from the image of the workpiece, wherein the image of the workpiece with the planar slice distinguished from the image of the workpiece is created prior to computing the entirety of tools paths for fabricating the workpiece.

* * * * *